Dec. 18, 1923.

A. KATZINGER

CAKE PAN

Filed Nov. 4, 1922

1,477,650

INVENTOR:
Arthur Katzinger,
By Nissen & Crane
ATTYS

Patented Dec. 18, 1923.

1,477,650

UNITED STATES PATENT OFFICE.

ARTHUR KATZINGER, OF CHICAGO, ILLINOIS, ASSIGNOR TO EDWARD KATZINGER COMPANY, OF CHICAGO, ILLINOIS, A CORPORATION OF ILLINOIS.

CAKE PAN.

Application filed November 4, 1922. Serial No. 599,005.

*To all whom it may concern:*

Be it known that I, ARTHUR KATZINGER, a citizen of the United States, residing at Chicago, in the county of Cook and State of Illinois, have invented certain new and useful Improvements in Cake Pans, of which the following is a specification.

My invention relates to cake pans and has for one of its objects the provision of a simple and efficient cake pan construction having means for permitting the quick and easy removal of the cake therefrom.

A further object is the provision of a cake pan having a narrow slot adjacent the bottom thereof in the side wall permitting the insertion of a tool for loosening the bottom of a cake from said pan.

A still further object is the provision of a cake pan having a narrow slot adjacent its bottom and a plate mounted over said opening with simple and efficient means for holding the plate in position and permitting removal of the plate for loosening a cake from the bottom of the pan.

Other objects will appear hereinafter.

An embodiment of my invention is illustrated in the accompanying drawing, forming a part of this specification, and in which—

Figure 1:
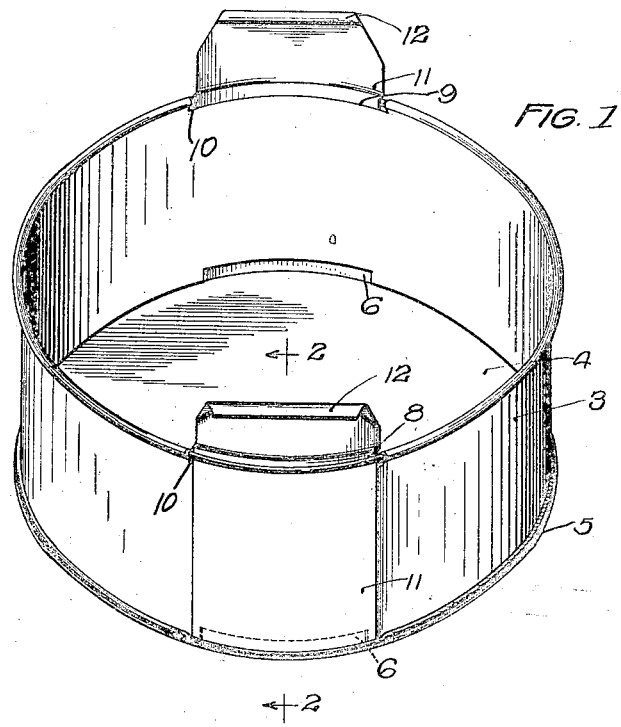
Fig. 1 is a perspective view of a cake pan embodying my invention.
Figure 2:
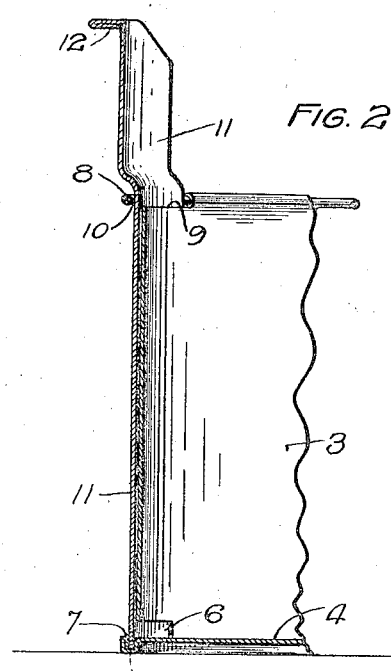
Fig. 2 is an enlarged fragmental section taken on line 2—2 of Fig. 1.

Referring more particularly to the drawing, I have indicated my invention as applied to a cake pan having a cylindrical upright wall, but it will be understood that the pan may be made of any desired shape or size.

In my improved baking pan I provide an upright wall 3 with a bottom 4 at the lower edge of said upright wall. The bottom 4 is connected to the upright wall by a double seam 5. The seam is arranged so that it extends downwardly below the bottom 4.

At one or more positions in the upright wall 3 I provide narrow openings 6. In the present instance I have indicated two of such openings, but it will be apparent that the number may be varied as desired. The opening 6 is preferably formed by cutting away a piece of the upright wall 3 adjacent the seam, as clearly indicated. This permits leaving a recess 7 in the seam at the lower edge of the opening 6. The seam 5 is arranged so that its upper edge will not extend above the top surface of the bottom 4. This permits insertion of a knife, not shown, or other implement through opening 6 to loosen a cake, or the like, from the bottom 4. The cake can then be loosened from the wall 3 by running a knife, not shown, down on the inner surface of the wall and then drawing the knife around the interior surface of the upright wall. This permits the easy removal of a cake from my improved pan construction.

The upright wall 3 is preferably provided with a wire 8 turned in forming a rim at the top of the pan. A portion 9 of the wall 3 is cut away over the opening 6 and preferably a little wider than the length of said opening 6. The opening at the cut-away portion 9 provides an opening 10 between the wire 8 and wall 3. A plate 11 is curved to fit the curvature of the wall 3 and passed through the opening at cut-away portion 9 down over opening 6 and into recess 7. The plate 11 therefore closes the opening 6 so that when the dough is poured into the pan it will be held in the latter for baking. The opening at 10 being wider than the length of opening 6 will permit the use of a plate 11 wide enough to easily cover said opening 6, thereby sealing the latter against the passage of the dough.

The top end 12 of the plate 11 may be bent over as indicated, to provide a handle for moving the plate 11 into and out of its operative position.

Sometimes it is desirable to permit the cake, or the like, to sweat in the pan, and this sweating will sometimes free such cake from the interior of the surface. When this is desired the extended ends of plates 11 may be used to support the pan and cake in inverted position. When the cake has been loosened from the pan it will drop down by gravity onto the surface supporting the pan.

It is desirable to offset the plates 11, as clearly indicated in the drawing, so that a number of the pans may be placed in a vertical stack with one pan disposed between the offset upper ends of the plates 11 of the pan below. This provides a nesting effect and one which will maintain the pans in stacks to facilitate their storing and shipment. By offsetting the plates 11 the pans can be placed closer together in a stack than if these plates were not offset and one pan would have to be set in the top ends of the plates of the pan below. This offsetting of the plates 11 gives these plates greater strength than if they were not offset.

It will be noted that in forming the seam 5 that this raises the bottom 4 up so that its upper surface is substantially even with the lower edge of the opening 6. This insures spacing the bottom 4 in such a position that a knife can be inserted under the bottom of the cake without cutting into the latter in removing the same from the pan.

I claim:—

1. A cake pan comprising a bottom, an upright wall extending upwardly from the bottom and having a narrow opening therein extending downwardly to the level of the top surface of said bottom, and a plate slidable vertically over said opening, said bottom having a retainer for the lower edge of said plate disposed below the top surface of said bottom.

2. A cake pan comprising a bottom, an upright wall extending upwardly from the bottom and having a narrow opening therein with the lower edge of the opening at the top surface of said bottom, a double seam securing the bottom and upright wall together, there being a recess in the seam adjacent said opening, a wire in the rim of the upright wall with an opening in the latter adjacent the wire and directly over said first-mentioned opening, and a plate extending through the second-mentioned opening, disposed over the first-mentioned opening and extending into said recess.

3. A cake pan comprising a tubular upright wall, a bottom at the lower end of said upright wall, with a double seam securing the bottom to said upright wall, there being a narrow opening extending longitudinally around the upright wall with the lower edge of said opening registering with the top surface of the bottom, a curved plate having its curvature substantially concentric with the tubular wall, the bottom end of said plate engaging said double seam and a portion of the plate being disposed over and closing said opening, and means at the top of said upright wall holding the plate in the position mentioned.

4. A cake pan comprising a cylindrical wall, a wire turned in at the top edge of said wall with a portion of the wall cut away around a part of the wire, a bottom at the lower end of said upright wall with an opening in the latter having its bottom edge substantially even with the top surface of said bottom, a double seam securing the upright wall and bottom together with the double seam extending below said bottom and a portion of the upright wall being cut away adjacent said opening providing a recess in the double seam, and a plate having portions engaging said wire and recess and a portion disposed over and closely fitting the upright wall around said opening.

5. A cake pan comprising a bottom, an upright wall extending upwardly from the bottom and having a narrow opening therein with the lower edge of said opening at the top surface of said bottom, and means for covering said opening having the lower edge thereof movable to a position below the top surface of said bottom.

6. A cake pan comprising a bottom, an upright wall extending upwardly from the bottom and having a narrow opening therein with the lower edge of the opening at the top of said bottom, a double seam securing the bottom and upright wall together, there being a recess in the seam adjacent said opening and below the top face of said bottom, and means for engaging said recess and closing said opening.

7. A cake pan comprising a bottom, an upright wall extending upwardly from the bottom having a plurality of spaced narrow openings therein adjacent said bottom and having a reinforcing member secured to the top edge of said wall, and a plurality of plates attached to the upright wall and covering said opening, said plates extending above and being disposed at the outside of said upright wall and inside of said reinforcing member and providing feet for supporting the cake pan in elevated inverted position.

8. A cake pan comprising upright walls having openings therein with the lower edges of said openings substantially even with the top surface of the bottom of the pan, plates attached to the sides of the pan with portions extending over said openings, said plates extending above the pans and offset outwardly providing stiffening means for the plates and a retaining member at both bottom and top of said wall extending across the outer face of said plate.

9. A cake pan comprising upright walls, plates attached to the upright walls and extending above the tops of the latter, said plates being offset outwardly so as to engage the upright walls of a similar pan to facilitate nesting a plurality of said pans and a reinforcing band extending about said pan and slidably engaging the outer faces of said plates.

10. A baking pan having a sheet metal bottom the periphery of which is offset downwardly and bent to form a groove opening upwardly substantially on the level of the top face of said bottom, said pan having upwardly extending side walls secured in said groove and having a portion at the lower edge thereof cut away to provide an opening flush with the top face of said bottom, and a closure for said opening having the lower edge thereof arranged to extend below the top face of said bottom and to engage said groove to form a tight closure for said opening.

In testimony whereof I have signed my name to this specification on this 1st day of November, A. D. 1922.

ARTHUR KATZINGER.